(12) United States Patent
Frisch et al.

(10) Patent No.: US 8,635,807 B2
(45) Date of Patent: Jan. 28, 2014

(54) BED BUG MONITOR

(76) Inventors: Jeffrey Frisch, Brooklyn, NY (US); Jonathan Frisch, Brooklyn, NY (US)

( * ) Notice: Subject to any disclaimer, the term of this patent is extended or adjusted under 35 U.S.C. 154(b) by 70 days.

(21) Appl. No.: 13/028,411

(22) Filed: Feb. 16, 2011

(65) Prior Publication Data
US 2012/0204476 A1 Aug. 16, 2012

(51) Int. Cl.
*A01M 1/14* (2006.01)
*A01M 1/02* (2006.01)
*A01M 1/10* (2006.01)

(52) U.S. Cl.
USPC .............................. 43/114; 43/121

(58) Field of Classification Search
USPC ............... 43/114, 132.1, 133, 115, 123, 121; 119/61.53
See application file for complete search history.

(56) References Cited

U.S. PATENT DOCUMENTS

| | | | | |
|---|---|---|---|---|
| 140,954 A * | 7/1873 | Rubarth | ........................... | 43/121 |
| 393,273 A * | 11/1888 | Thum | .............................. | 43/115 |
| 4,263,740 A * | 4/1981 | Hemsarth et al. | ............... | 43/114 |
| 4,423,564 A * | 1/1984 | Davies et al. | ................... | 43/121 |
| 5,090,153 A * | 2/1992 | Mullen et al. | ................... | 43/114 |
| 5,189,830 A * | 3/1993 | Montemurro | ................... | 43/114 |
| 5,277,149 A * | 1/1994 | East | ............................. | 119/51.5 |
| 5,357,709 A * | 10/1994 | Lin | ................................. | 43/131 |
| 6,305,122 B1 * | 10/2001 | Iwao et al. | ...................... | 43/112 |
| 6,609,329 B2 * | 8/2003 | McCallum | ....................... | 43/107 |
| 6,792,713 B2 * | 9/2004 | Snell | ............................... | 43/124 |
| 6,998,133 B2 * | 2/2006 | Simpson | ......................... | 43/114 |
| 7,204,054 B2 * | 4/2007 | Mayo et al. | ..................... | 43/131 |
| 7,299,587 B1 * | 11/2007 | Metcalfe | ......................... | 43/121 |
| 7,591,099 B2 * | 9/2009 | Lang et al. | ...................... | 43/107 |
| 7,743,552 B2 * | 6/2010 | Borth et al. | ..................... | 43/131 |
| 2008/0092433 A1 * | 4/2008 | Durand et al. | .................. | 43/107 |
| 2009/0282728 A1 * | 11/2009 | McKnight et al. | .............. | 43/109 |
| 2011/0047860 A1 * | 3/2011 | Black et al. | ..................... | 43/123 |
| 2012/0151823 A1 * | 6/2012 | Donoho et al. | ................. | 43/123 |

* cited by examiner

*Primary Examiner* — Kimberly Berona
*Assistant Examiner* — Marc Burgess
(74) *Attorney, Agent, or Firm* — Bernard Malina

(57) ABSTRACT

A bed bug monitor includes a base and a central housing. The central housing is insulated and encloses a supply of solid carbon dioxide. During use an aperture in the housing releases a plume of carbon dioxide vapor which attracts bed bugs onto the base.

7 Claims, 5 Drawing Sheets

BED BUG MONITOR

FIELD OF THE INVENTION

The present invention is directed toward a bed bug monitor apparatus which uses carbon dioxide ($CO_2$) as a bed bug attractant.

BACKGROUND OF THE INVENTION

Recently there has been increased attention placed on the increased and unwanted presence of bed bugs in hotels and even in private homes.

While the use of carbon dioxide as an attractant for bed bugs is known, the use and handling of carbon dioxide presents certain dangers. As a result, there remains a need for a safe, lockable, easily used apparatus for the monitoring of bed bugs.

OBJECTS AND SUMMARY OF THE INVENTION

It is an object of the present invention to provide a bed bug monitor which utilizes carbon dioxide as an attraction for bed bugs.

Another object of the invention is to provide a bed bug monitor which attracts and traps bed bugs.

In accordance with the present invention there is provided a bed bug monitor which includes a circular base and a central housing. The central housing is insulated and encloses a supply of carbon dioxide in block or pellet form. An aperture in the housing releases a plume of carbon dioxide vapor which attracts bed bugs.

These other aspects of the invention will become apparent from the following description of the preferred embodiments taken in conjunction with the following drawings, although variations and modifications may be effected without departing from the spirit and scope of the novel concepts of the disclosure.

DESCRIPTION OF THE INVENTION

Figure 1:
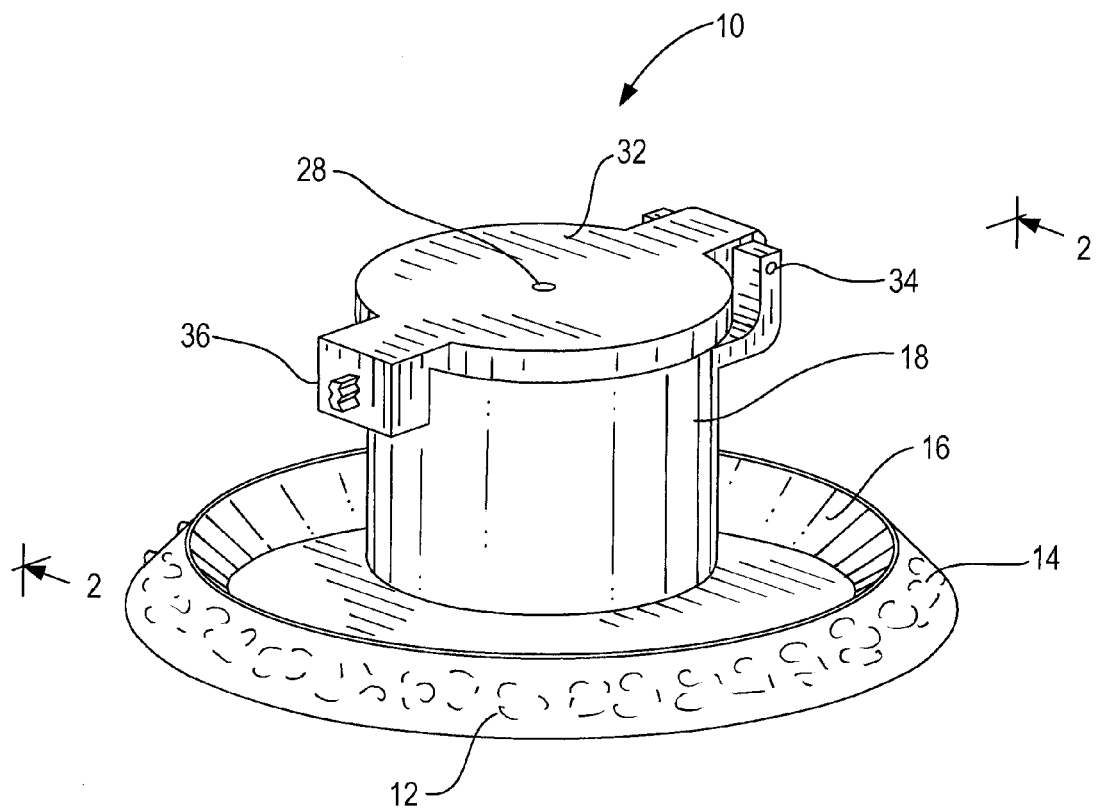
FIG. 1 is an overall perspective view of a first embodiment of a bed bug monitor made according to the present invention.
Figure 2:
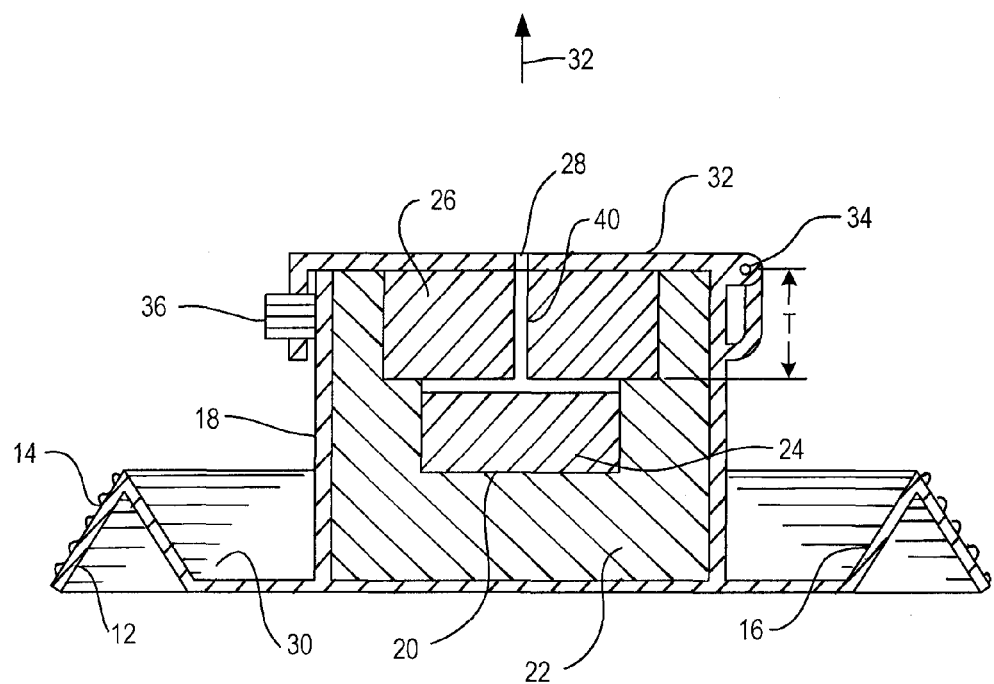
FIG. 2 is a schematic cross-sectional view taken along the line 2-2 of FIG. 1.
Figure 3:
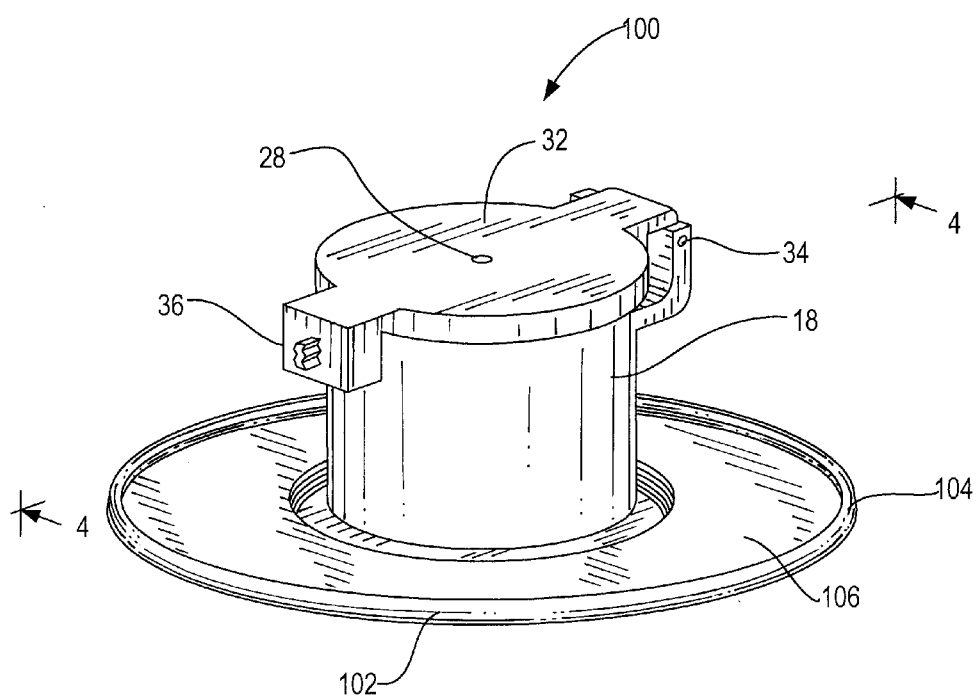
FIG. 3 is an overall perspective view of a second embodiment of a bed bug monitor made according to the present invention.
Figure 4:
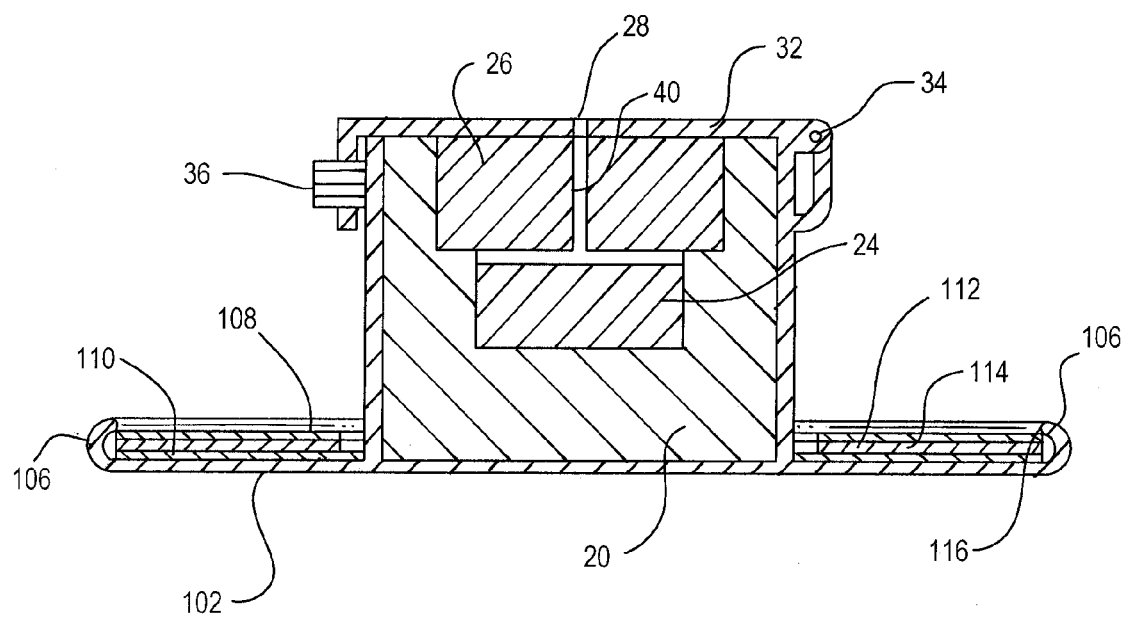
FIG. 4 is a cross-sectional view taken along the line 4-4 of FIG. 3.

With reference to the drawings, FIGS. 1 and 2 show a first embodiment 10 of the invention which includes a generally circular base 12 having an upwardly sloping portion 14 which is somewhat roughened in surface contour, a downwardly sloping portion 16 which, during use, is coated with talcum powder, and a central housing 18. The central housing 18 is generally cup-shaped and includes an insulated liner 20 which may be made of styrofoam insulation, or conventional double walled construction. The styrofoam insulation liner 20 includes a cavity 22 which contains carbon dioxide in the form of a block 24 or in the form of pellets. A styrofoam cover 26 which includes a relatively small diameter aperture 28 covers the carbon dioxide 24.

The diameter of the aperture 28 is extremely small relative to the thickness "T" of the cover, resulting in a controlled and measured release of $CO_2$ vapor out through the narrow passage 40.

A cover 32 is connected to the housing 18 by a hinge 34 and a lock 36. The lock 36 prevents unauthorized access to the $CO_2$.

Bed bugs are attracted to the apparatus by the plume of $CO_2$ released through the aperture 28. The roughened surface 14 allows the bed bugs to climb the upwardly sloped surface 14. The bed bugs drop into the central area 30. Talcum powder on surface 16 creates a slippery surface which prevents the bed bugs from climbing out.

The apparatus 10 thus allows a user to easily inspect the central area 30 for the presence of bed bugs.

FIGS. 3-6 show a second embodiment of the invention 100. In the embodiment 100 shown in FIGS. 3-6, the central housing 18, the styrofoam liner 20 and the cover 32 are the same as has been previously described in connection with FIGS. 1 and 2.

The circular base 102 has a flat portion 104 which surrounds the central housing 18 and which has an upwardly and inwardly curved peripheral rim 106.

Figure 5:
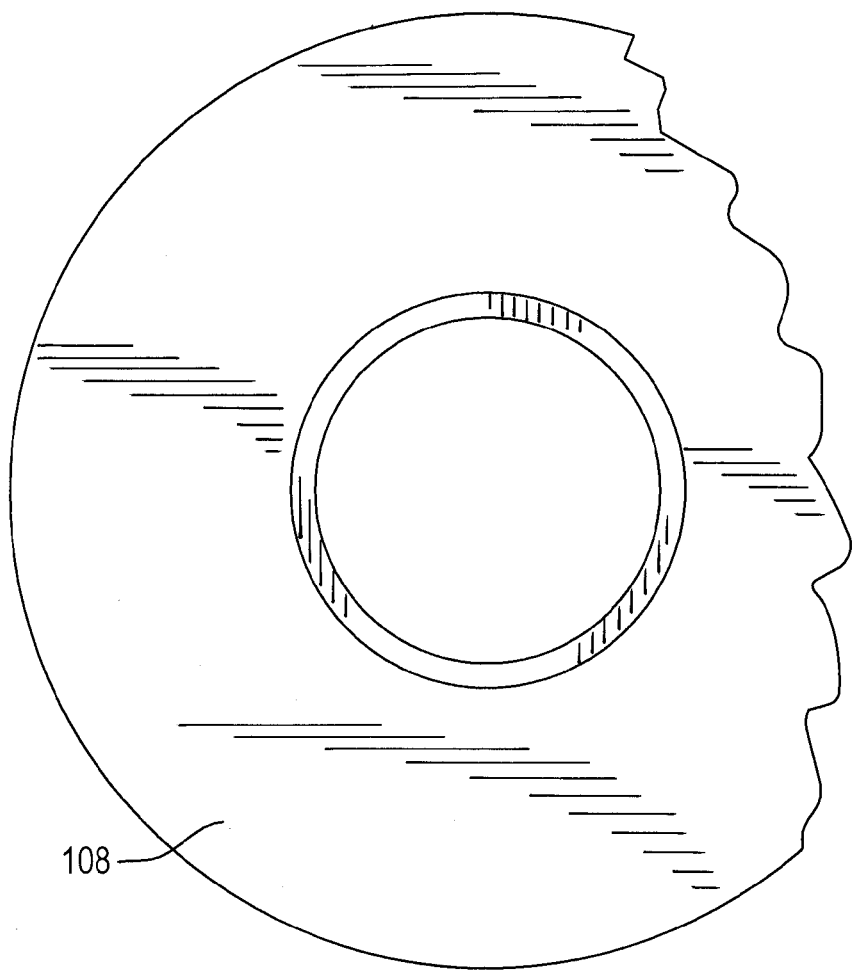
FIG. 5 is a fragmentary plan view of an adhesive disc which is used with the embodiment shown in FIG. 3.
Figure 6:
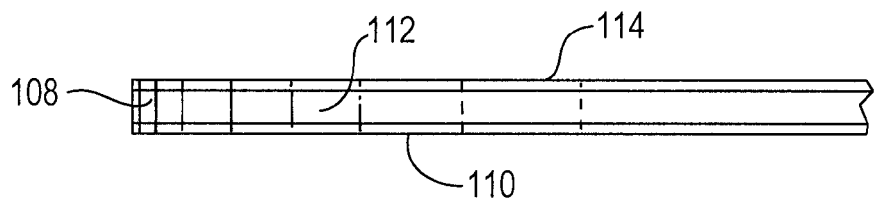
FIG. 6 is a fragmentary side elevation view of the adhesive disc of FIG. 5.

A circular glue board 108 is provided as is shown in FIGS. 5 and 6. The glue board 108 has a cardboard base 110, an adhesive layer 112 and a release layer 114. The glue board is proportioned to allow a user to snap the glue board 108 past the inner edge 116 of the rim 106. The user can then remove the release layer 114, thus exposing the adhesive layer.

Bed bugs are attracted by a plume of $CO_2$ as previously described. The bed bugs climb over the rim 106 and fall onto the adhesive layer 112 and are trapped.

The user can easily inspect the apparatus for the presence of bed bugs which are trapped by the adhesive layer 112. The glue board 108 may be removed and replaced with a like item to permit re-use of the apparatus.

Carbon dioxide may be replenished by unlocking the cover 32. The locked cover 32 prevents unauthorized and potentially dangerous contact with carbon dioxide.

The foregoing specific embodiments of the present invention as set forth in the specification herein are for illustrative purposes only. Various deviations and modifications may be made within the spirit and scope of this invention, without departing from a main theme thereof.

We claim:

1. A bed bug monitor using carbon dioxide vapor as an attractant generated from solid carbon dioxide comprising:
    a base;
    a glue board disposed on said base with said glue board comprising:
        a substrate;
        an adhesive layer, disposed on said substrate;
        a release layer disposed on said adhesive layer;
    a hollow housing disposed on said base and having a hollow cavity to contain the solid carbon dioxide;
    an insulated cover disposed over a top of and covering said cavity;
    a lock connecting said insulated cover and said hollow housing;
    an insulation layer disposed within said hollow housing forming an insulated cavity and with said insulated cover having a relatively narrow passage communicating with said insulated cavity in said hollow housing, said narrow passage terminating in an aperture for releasing a plume of said carbon dioxide vapor, said aperture consisting of a single aperture in said housing and cover operative for releasing outward from said bed bug monitor said carbon dioxide vapor, and said aperture having a diameter smaller than a thickness (T) of said insulated cover, and wherein in a locked position of the insulated cover to the hollow housing all of the carbon dioxide vapor can only be released outward of the monitor through the single aperture.

2. A bed bug monitor as claimed in claim 1 wherein said base is circular.

3. A bed bug monitor as claimed in claim 1 wherein said hollow housing is centrally located on said base.

4. A bed bug monitor as claimed in claim 1 wherein said base comprises:
   an upwardly sloped portion;
   a downwardly sloped portion; and
   a central portion.

5. A bed bug monitor as claimed in claim 4 wherein said upwardly sloped portion of said base is roughened.

6. A bed bug monitor as claimed in claim 1 wherein said base comprises a rim portion.

7. A bed bug monitor as claimed in claim 1 wherein said base comprises:
   an upwardly sloped portion having a roughened surface;
   a downwardly sloped portion having talcum powder on a surface thereof;
   a central portion having said adhesive layer disposed thereon.

* * * * *